United States Patent [19]

Margolis

[11] 4,148,560

[45] Apr. 10, 1979

[54] OPTICAL GUIDES

[75] Inventor: David S. Margolis, London, England

[73] Assignee: BICC Limited, London, England

[21] Appl. No.: 813,623

[22] Filed: Jul. 7, 1977

[30] Foreign Application Priority Data

Jul. 8, 1976 [GB] United Kingdom ............... 28481/76

[51] Int. Cl.² ................................................. G02B 5/16
[52] U.S. Cl. ..................................................... 350/96.23
[58] Field of Search ............... 350/96.23, 96.24, 96.29, 350/96.30, 96.33

[56] References Cited

U.S. PATENT DOCUMENTS

| 3,563,716 | 2/1971 | Li ........................................ 350/96.24 |
| 3,980,390 | 9/1976 | Yamamoto et al. .............. 350/96.33 |

FOREIGN PATENT DOCUMENTS 1436319 5/1976 United Kingdom .................. 350/96.23

Primary Examiner—John K. Corbin
Assistant Examiner—Stewart Levy
Attorney, Agent, or Firm—Buell, Blenko & Ziesenheim

[57] ABSTRACT

In an optical cable comprising at least one optical bundle, individual fibres of the or each optical bundle and/or at least two fibre-groups each comprising an assembly of some of the fibres of the or each optical bundle being wholly or partially embedded in and mutually separated by encapsulating material throughout substantially the whole length of the bundle; at least one separate elongate non-optical reinforcing member; and, surrounding the bundle or bundles and the reinforcing member or members, an outer protective sheath, the or each optical bundle is loosely housed in a bore in the protective sheath, the or each reinforcing member is embedded in the sheath alongside the bore, each optical fibre has a continuous abrasion-resistant coating of a hardened material and the encapsulating material is of such a nature that, when appropriately treated, it can be removed from between the embedded fibres and/or the embedded fibre-groups at an end part of the cable or it can be softened to such an extent as to permit separation of individual optical fibres and/or fibre groups at said end part of the cable, without impairing the abrasion-resistant coatings of the optical fibres.

12 Claims, 1 Drawing Figure

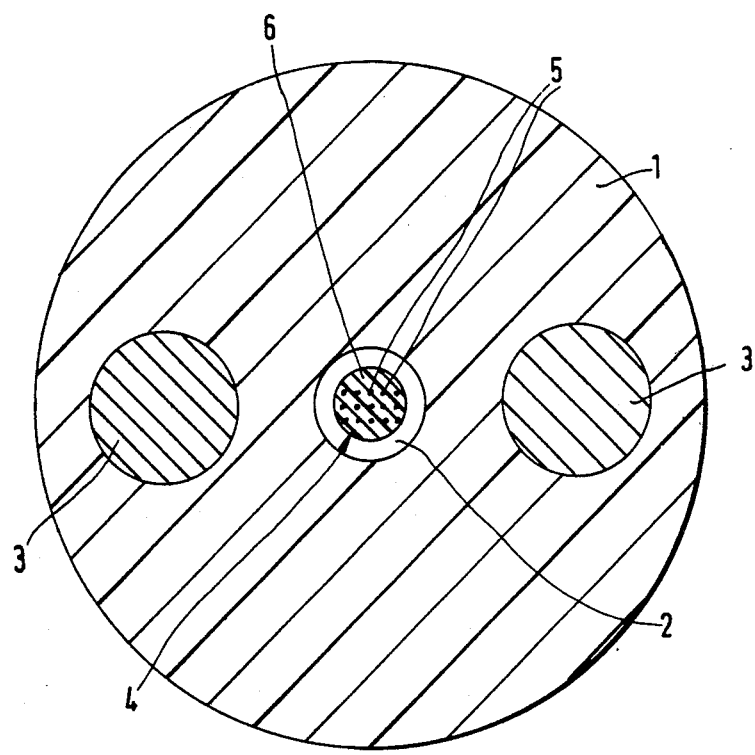

OPTICAL GUIDES

This invention relates to optical guides for the transmission of the ultra-violet, visible and infra-red regions of the electromagnetic spectrum, which regions, for convenience, will hereinafter be included in the generic term "light," and especially, but not exclusively, to optical waveguides for use in the communications field adapted for transmission of light having a wavelength within the range 0.8 to 1.3 micrometers.

The present invention is concerned with an optical guide in the form of an optical cable comprising at least one optical bundle comprising a plurality of optical fibres or a plurality of fibres including at least one optical fibre and at least one non-optical reinforcing fibre, at least one separate elongate non-optical reinforcing member, and, surrounding the bundle or bundles and the reinforcing member or members, an outer protective sheath, individual fibres of the or each optical bundle and/or at least two fibre-groups, each comprising an assembly of some of the fibres of the or each optical bundle, being wholly or partially embedded in and mutually separated by encapsulating material throughout substantially the whole length of the bundle, which encapsulating material prevents or at least substantially reduces relative movement between the embedded fibres and/or the embedded fibre-groups.

The present invention provides an improved optical cable of the aforesaid kind in which, when desired, individual optical fibres and/or fibre-groups of the or each optical bundle at the end of the cable can be seaprated from each other for the purpose of connecting each optical fibre or fibre-group to a light source or light detecting device with negligible risk of damage to the optical fibres.

According to the present invention in the optical cable the or each optical bundle is loosely housed in a bore in the protective sheath, the or each reinforcing member is embedded in the sheath alongside the bore, the individual optical fibres of the or each optical bundle and/or the individual optical fibres of each fibre-group of the or each optical bundle each has a continuous abrasion-resistant coating of a hardened material and the encapsulating material of the or each optical bundle is of such a nature that, when appropriately treated, it can be removed from between the embedded fibres and/or the embedded fibre-groups at an end part of the cable or it can be softened to such an extent as to permit separation of individual optical fibres and/or fibre-groups at said end part of the cable, without impairing the abrasion-resistant coatings of the optical fibres.

The encapsulating material may be one that can be removed from an optical bundle by treating the material at an end part of the optical cable with a solvent or other agent that will not attack the hardened material of the abrasion-resistant coatings but that will convert the encapsulating material to a liquid or semi-liquid form so that it will flow from between the optical fibres and/or fibre-groups at said end part or it will be so softened that separation of individual optical fibres and/or fibre-groups can be effected. Examples of encapsulating materials of this kind include polystyrene and acrylic resins. Suitable solvents for treating these encapsulating materials include toluene and carbon tetrachloride. Alternatively, the encapsulating material may be one that can be melted or softened at an end part of the optical cable to a sufficient extent to permit separation of individual optical fibres and/or fibre-groups of the bundle at said end part by heating said end part of the bundle to a predetermined temperature, which temperature is insufficiently high to damage the abrasion-resistant coatings on the optical fibres. Examples of encapsulating materials that can be melted or softened by the application of heat include thermoplastic rubber and polyurethane. Encapsulating materials of this kind are soft and serve as a buffer coating for the optical bundle.

Preferred hardenable materials for forming the abrasion-resistant coatings on the optical fibres include thermosetting enamels, such as polyester imide resins and polyvinyl acetal type resins, and thermoplastics materials that are resistant to high temperatures, such as fluorinated ethylenepropylene copolymer and ethylene-tetrafluoroethylene copolymer.

Preferably the optical fibres and/or fibre-groups of the optical cable are embedded in the encapsulating material in a predetermined configuration to provide for ready identification of an optical fibre at any transverse cross-section along the length of the bundle and in a preferred embodiment they are assembled side-by-side in one or more than one row with their axes substantially parallel to one another. Alternatively, the optical fibres and/or fibre groups may be bunched, twisted or stranded together.

Where the optical cable comprises two or more optical bundles, the encapsulating material of each optical bundle may be of a colour distinguishable from that of the encapsulating material of the or each other optical bundle.

The present invention also includes, for use in an optical cable as hereinbefore described, an optical bundle comprising a plurality of optical fibres or a plurality of fibres including at least one optical fibre and at least one non-optical reinforcing fibre, individual fibres and/or at least two fibre-groups each comprising an assembly of some of the fibres being wholly or partially embedded in and mutually separated by encapsulating material throughout substantially the whole length of the bundle, which encapsulating material prevents or at least substantially reduces relative movement between the embedded fibres and/or the embedded fibre-groups, wherein the optical fibres each has a continuous abrasion-resistant coating of a hardened material and the encapsulating material is of such a nature that, when appropriately treated, it can be removed from between the embedded fibres and/or the embedded fibre-groups at an end part of the cable or it can be softened to such an extent as to permit separation of individual optical fibres and/or fibre goups at said end part of the cable, without impairing the abrasion-resistant coatings of the optical fibres.

The invention is further illustrated by description, by way of example, of a preferred optical cable with reference to the accompanying drawing which shows a transverse cross-sectional view of the cable drawn on a greatly enlarged scale.

Referring to the drawing, the optical cable comprises an external protective sheath of plastics material which has a centre bore 2 and, embedded in the sheath on opposite sides of the bore, two reinforcing wires 3 of greater diameter than the bore. Loosely housed in the bore 2 is an optical bundle 4 comprising a plurality of optical fibres 5 embedded in and mutually separated by acrylic resin to which prevents relative movement between the embedded fibres. The optical fibres 5 are arranged in three rows with their axes substantially parallel to one another so that an optical fibre can be readily identified at any transverse cross-section along the bundle 4. Each optical fibre 5 has a continuous abrasion-resistant coating of a polyester imide resin.

When it is desired to connect each optical fibre 5 to a light source or light detecting device, an end part of the optical bundle 4 is treated with a solvent such as toluene or carbon tetrachloride which converts the acrylic resin 6 at the end part of the bundle to a semi-liquid form so that the individual optical fibres can be readily separated in order that the required optical fibre connections can be made.

What I claim as my invention is:

1. An optical cable comprising at least one optical bundle comprising at least a plurality of optical fibres, individual fibres of the or each optical bundle and/or at least two fibre-groups each comprising an assembly of some of the fibres of the or each optical bundle being at least partially embedded in and mutually separated by encapsulating material throughout substantially the whole length of the bundle, which encapsulating material at least substantially reduces relative movement between the embedded fibres and/or the embedded fibre-groups; at least one separate elongate non-optical reinforcing member; and, surrounding the bundle or bundles and the reinforcing member or members, an outer protective sheath, wherein the protective sheath has a bore in which the optical bundle is loosely housed and the or each reinforcing member is embedded in the sheath alongside the bore, and wherein each optical fibre has a continuous abrasion-resistant coating of a hardened material and the encapsulating material of the or each optical bundle is of such a nature that, when appropriately treated, it can be removed from between the embedded fibres and/or the embedded fibre-groups at an end part of the cable or it can be softened to such an extent as to permit separation of individual optical fibres and/or fibre groups at said end part of the cable, without impairing the abrasion-resistant coatings of the optical fibres.

2. An optical cable as claimed in claim 1, wherein the encapsulating material can be removed from the or each optical bundle by treating the material at an end part of the optical cable with a solvent or other agent that will not attack the hardened material of the abrasion-resistant coatings but that will convert the encapsulating material to a form so that it will flow from between the optical fibres and/or fibre-groups at said end part or it will be so softened that separation of individual optical fibres and/or fibre-groups can be effected.

3. An optical cable as claimed in claim 2, wherein the encapsulating material is polystyrene.

4. An optical cable is claimed in claim 2, wherein the encapsulating material is an acrylic resin.

5. An optical cable as claimed in claim 1, wherein the encapsulating material can be melted or softened at an end part of the optical cable to a sufficient extent to permit separation of individual optical fibres and/or fibre groups of the bundle at said end part by heating said end part of the bundle to a predetermined temperature, which temperature is insufficiently high to damage the abrasion-resistant coatings on the optical fibres.

6. An optical cable is claimed in claim 5, wherein the encapsulating material is thermoplastic rubber.

7. An optical cable is claimed in claim 5, wherein the encapsulating material is polyurethane.

8. An optical cable as claimed in claim 1, wherein the abrasion-resistant coating of each optical fibre is a thermosetting enamel.

9. An optical cable as claimed in claim 1, wherein the abrasion-resistant coating of each optical fibre is a thermoplastic material that is resistant to high temperatures.

10. An optical cable as claimed in claim 1, wherein the optical fibres and/or fibre-groups of the or each optical bundle are embedded in the encapsulating material in a predetermined configuration to provide for ready identification of an optical fibre or fibre-group at any transverse cross-section along the length of the bundle.

11. An optical cable as claimed in claim 10, wherein the optical fibres and/or fibre-groups of the or each optical bundle extend side-by side in at least one row with their axes substantially parallel to one another.

12. An optical cable as claimed in claim 1, which comprises at least two optical bundles, wherein the encapsulating material of each optical bundle is of a colour distinguishable from that of the encapsulating material of the or each other optical bundle.

* * * * *

UNITED STATES PATENT AND TRADEMARK OFFICE
CERTIFICATE OF CORRECTION

PATENT NO. : 4,148,560
DATED : April 10, 1979
INVENTOR(S) : David S. Margolis

It is certified that error appears in the above–identified patent and that said Letters Patent are hereby corrected as shown below:

Column 1, lines 32-33, "seaprated" should read --separated--.

Signed and Sealed this

Eleventh Day of September 1979

[SEAL]

Attest:

LUTRELLE F. PARKER

Attesting Officer    Acting Commissioner of Patents and Trademarks